United States Patent
Kalyanasundharam et al.

(10) Patent No.: US 11,874,783 B2
(45) Date of Patent: Jan. 16, 2024

(54) COHERENT BLOCK READ FULFILLMENT

(71) Applicant: Advanced Micro Devices, Inc., Santa Clara, CA (US)

(72) Inventors: Vydhyanathan Kalyanasundharam, Sunnyvale, CA (US); Amit P. Apte, Austin, TX (US); Eric Christopher Morton, Austin, TX (US); Ganesh Balakrishnan, Austin, TX (US); Ann M. Ling, San Ramon, CA (US)

(73) Assignee: Advanced Micro Devices, Inc., Santa Clara, CA (US)

(*) Notice: Subject to any disclaimer, the term of this patent is extended or adjusted under 35 U.S.C. 154(b) by 93 days.

(21) Appl. No.: 17/557,639

(22) Filed: Dec. 21, 2021

(65) Prior Publication Data
US 2023/0195662 A1 Jun. 22, 2023

(51) Int. Cl.
*G06F 13/16* (2006.01)
*G06F 3/06* (2006.01)

(52) U.S. Cl.
CPC .......... *G06F 13/1673* (2013.01); *G06F 3/061* (2013.01); *G06F 3/0656* (2013.01); *G06F 3/0658* (2013.01); *G06F 3/0679* (2013.01); *G06F 2213/0038* (2013.01)

(58) Field of Classification Search
CPC ..... G06F 2212/1041; G06F 2212/1044; G06F 13/1673; G06F 12/0891; G06F 13/1668; G06F 12/0815; G06F 12/0817; G06F 12/0828
See application file for complete search history.

(56) References Cited

U.S. PATENT DOCUMENTS

| 7,155,572 B2 | 12/2006 | Hughes et al. |
| 2016/0188499 A1 | 6/2016 | Nagarajan et al. |
| 2017/0004084 A1 | 1/2017 | Kim et al. |
| 2019/0205280 A1 | 7/2019 | Kalyanasundharam et al. |

(Continued)

FOREIGN PATENT DOCUMENTS

KR 10-2017-0004831 A 1/2017

OTHER PUBLICATIONS

International Search Report and Written Opinion for International Application No. PCT/US2022/052765 dated May 9, 2023, 8 pages.

*Primary Examiner* — Charles Rones
*Assistant Examiner* — Hewy H Li
(74) *Attorney, Agent, or Firm* — Polansky & Associates, P.L.L.C.; Paul J. Polansky; Nathan H. Calvert

(57) ABSTRACT

A coherent memory fabric includes a plurality of coherent master controllers and a coherent slave controller. The plurality of coherent master controllers each include a response data buffer. The coherent slave controller is coupled to the plurality of coherent master controllers. The coherent slave controller, responsive to determining a selected coherent block read command is guaranteed to have only one data response, sends a target request globally ordered message to the selected coherent master controller and transmits responsive data. The selected coherent master controller, responsive to receiving the target request globally ordered message, blocks any coherent probes to an address associated with the selected coherent block read command until receipt of the responsive data is acknowledged by a requesting client.

20 Claims, 5 Drawing Sheets

(56) References Cited

U.S. PATENT DOCUMENTS

2020/0081650 A1     3/2020  Herrell et al.
2020/0081844 A1*    3/2020  Kalyanasundharam .................... G06F 12/0833
2020/0125518 A1*    4/2020  Ringe ................. G06F 12/0817
2020/0226081 A1     7/2020  Kalyanasundharam et al.

* cited by examiner

COHERENT BLOCK READ FULFILLMENT

BACKGROUND

Computer systems utilize a variety of peripheral components for different input/output and communication functions. A system-on-chip (SOC) combines data processors such as central processing unit (CPU) cores and a graphics processing unit (GPU) with peripheral controllers and memory interfaces on single integrated circuit chip and is well-suited for portable, battery-powered operation. For example, an SOC could incorporate a display controller, an image signal processor (ISP), and other peripheral controllers on the SOC to enable the input and output of information to and from the computer system. In such multi-node SOCs, the devices typically transfer data between resources such as memory by routing accesses through a large, on-chip routing circuit or "data fabric". In some systems, a data fabric is provided on an input/output (I/O) die including memory controllers, while multiple chiplets each contain processor cores. The chiplets and I/O die are mounted to a common package substrate connected by high speed interconnects such as Infinity Fabric™ (IF) interconnects.

In such multi-node computer systems, coherency protocols are used to maintain the coherency of data used by different processing nodes. For example, if a processor attempts to access data at a certain memory address, it must first determine whether the memory is stored in another cache and has been modified. To implement this cache coherency protocol, caches typically contain multiple status bits to indicate the status of the cache line to maintain data coherency throughout the system. One common coherency protocol is known as the "MOESI" protocol. According to the MOESI protocol, each cache line includes status bits to indicate which MOESI state the line is in, including bits that indicate that the cache line has been modified (M), that the cache line is exclusive (E) or shared (S), or that the cache line is invalid (I). The Owned (O) state indicates that the line is modified in one cache, that there may be shared copies in other caches and that the data in memory is stale. Transferring data between the cache subsystem of a first node to the cache subsystem of a second node typically involves multiple operations, with each operation contributing to the latency of the transfer.

Figure 1:
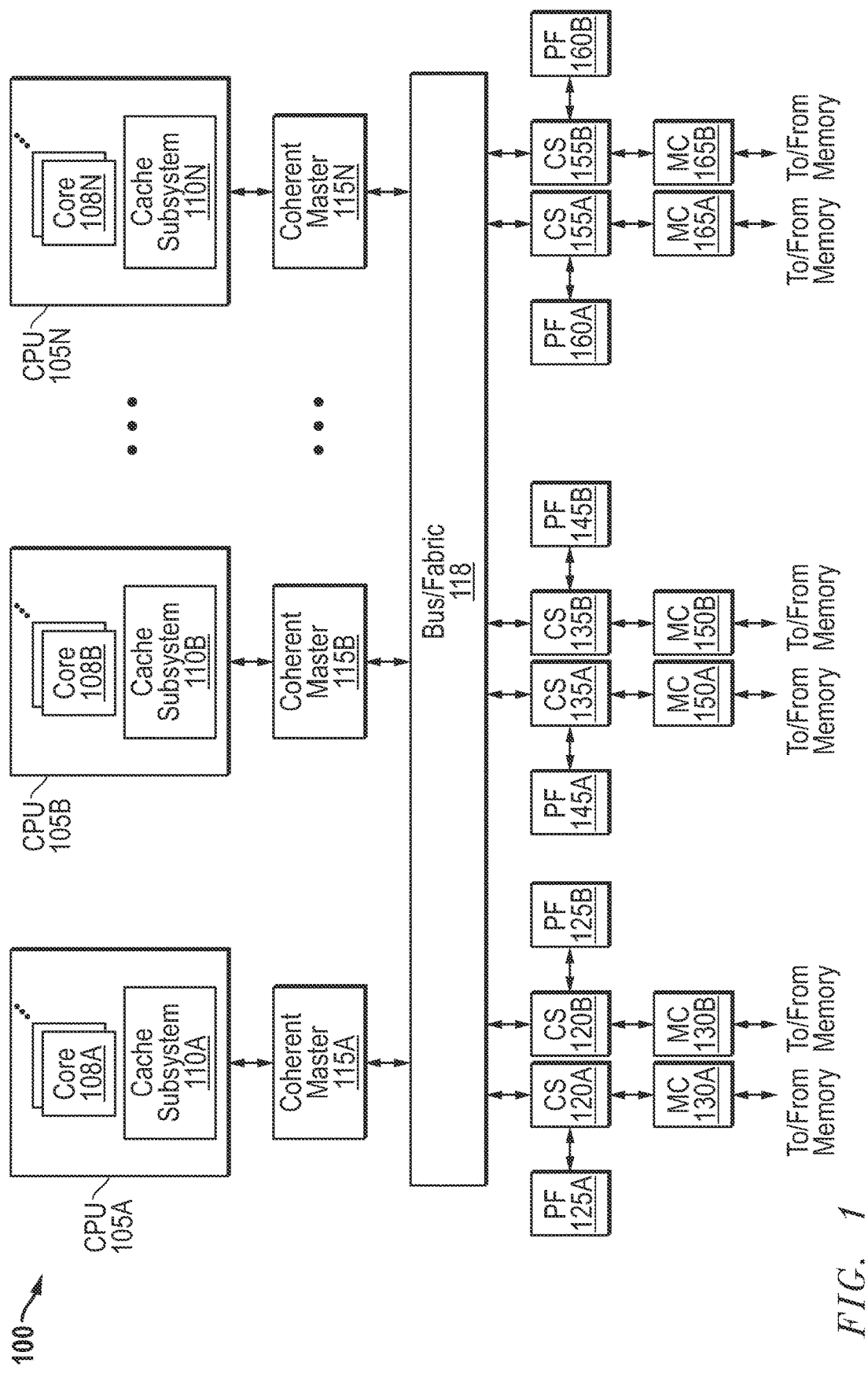
FIG. 1 illustrates block diagram form a multi-CPU system according to the prior art.

In the following description, the use of the same reference numerals in different drawings indicates similar or identical items. Unless otherwise noted, the word "coupled" and its associated verb forms include both direct connection and indirect electrical connection by means known in the art, and unless otherwise noted any description of direct connection implies alternate implementations using suitable forms of indirect electrical connection as well.

DETAILED DESCRIPTION OF ILLUSTRATIVE EMBODIMENTS

A coherent memory fabric includes a plurality of coherent master controllers and a coherent slave controller. The plurality of coherent master controllers each include a response data buffer. The coherent slave controller is coupled to the plurality of coherent master controllers. The coherent slave controller is operable to, responsive to determining a selected coherent block read command from a selected coherent master controller is guaranteed to have only one data response, send a target request globally ordered message to the selected coherent master controller and transmit responsive data.

A method includes, from a coherent master controller, transmitting a coherent block read command to a coherent slave controller over a coherent data fabric. At the coherent slave controller, the method includes, responsive to determining the coherent block read command is guaranteed to have only one data response, sending a target request globally ordered message to the coherent master controller and transmitting responsive data over the coherent data fabric.

A data processing system includes a plurality of data processors, a volatile memory, and a coherent memory fabric. The coherent memory fabric includes a plurality of coherent master controllers and a coherent slave controller. The plurality of coherent master controllers each include a response data buffer. The coherent slave controller is coupled to the plurality of coherent master controllers over the coherent memory fabric. The coherent slave controller is operable to, responsive to determining a selected coherent block read command from a selected coherent master controller is guaranteed to have only one data response, send a target request globally ordered message to the selected coherent master controller and transmit responsive data.

FIG. 1 illustrates in block diagram form a multiple-CPU system 100 according to the prior art. System 100 includes multiple CPUs 105A-N. Each CPU 105A-N can include any number of cores 108A-N, respectively, with the number of cores varying according to the implementation. Each CPU 105A-N also includes a corresponding cache subsystem 110A-N. Each cache subsystem 110A-N can include any number of levels of caches and any type of cache hierarchy structure.

Each CPU 105A-N is connected to a corresponding coherent master 115A-N. A "coherent master" is an agent that processes traffic flowing over an interconnect (e.g., bus/fabric 118) and manages coherency for a connected client processor. To manage coherency, a coherent master receives and processes coherency-related messages and probes and generates coherency-related requests and probes.

Each CPU 105A-N is coupled to a pair of coherent slaves via a corresponding coherent master 115A-N and bus/fabric 118. For example, CPU 105A is coupled through coherent master 115A and bus/fabric 118 to coherent slaves 120A-B. Coherent slave (CS) 120A is coupled to memory controller (MC) 130A and coherent slave 120B is coupled to memory controller 130B. Coherent slave 120A is coupled to probe filter (PF) 125A, with probe filter 125A including entries for memory regions that have cache lines cached in system 100 for the memory accessible through memory controller 130A. Probe filter 125A, and each of the other probe filters, can also be referred to as a "cache directory". Similarly, coherent slave 120B is coupled to probe filter 125B, with probe filter 125B including entries for memory regions that have cache lines cached in system 100 for the memory accessible through memory controller 130B. Each CPU 105A-N can be connected to other numbers of memory controllers besides two.

In a similar configuration to that of CPU 105A, CPU 105B is coupled to coherent slaves 135A-B via coherent master 115B and bus/fabric 118. Coherent slave 135A is coupled to memory via memory controller 150A, and coherent slave 135A is also coupled to probe filter 145A to manage the coherency of cache lines corresponding to memory accessible through memory controller 150A. Coherent slave 135B is coupled to probe filter 145B and coherent slave 135B is coupled to memory via memory controller 165B. Also, CPU 105N is coupled to coherent slaves 155A-B via coherent master 115N and bus/fabric 118. Coherent slaves 155A-B are coupled to probe filter 160A-B, respectively, and coherent slaves 155A-B are coupled to memory via memory controllers 165A-B, respectively. A "coherent slave" is an agent that manages coherency by processing received requests and probes that target a corresponding memory controller. Additionally, a "coherency probe" is a message passed from a coherency point to one or more caches in the computer system to determine if the caches have a copy of a block of data and optionally to indicate the state into which the cache should place the block of data.

When a coherent slave receives a memory request targeting its corresponding memory controller, the coherent slave performs parallel lookups to a corresponding early probe cache and to a corresponding probe filter. The coherent master may instead perform an early probe. Each early probe cache in system 100 tracks regions of memory, wherein a region includes a plurality of cache lines. The size of the region being tracked can vary from implementation to implementation. A "region" can also be referred to as a "page". When a request is received by a coherent slave, the coherent slave determines the region which is targeted by the request. Then a lookup is performed of the early probe cache for this region in parallel with performing a lookup to the probe filter. The lookup to the early probe cache will typically complete several cycles before the lookup to the probe filter. If the lookup to the early probe cache results in a hit, then the coherent slave sends an early probe to the CPU(s) which are identified in the hit entry. This facilitates an early retrieval of the data in cases when the early probe cache identifies the correct target, and reduces the latency associated with processing memory requests. It is noted there can be other connections from bus/fabric 118 to other components not shown to avoid obscuring the figure. For example, bus/fabric 118 can include connections to one or more I/O interfaces and one or more I/O devices.

Figure 2:
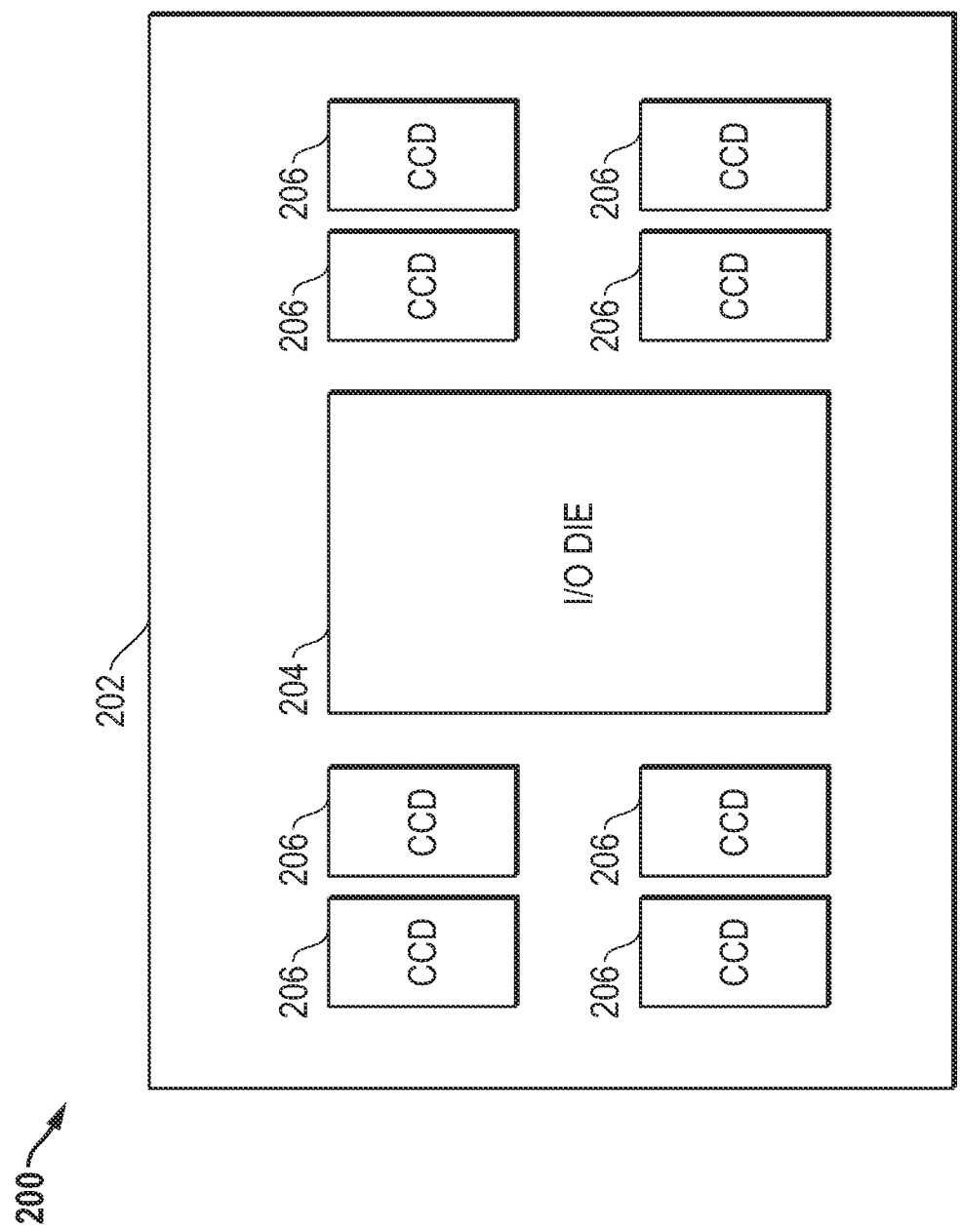
FIG. 2 illustrates in block diagram form a data processor according to some implementations.

FIG. 2 illustrates in block diagram form a data processor 200 according to some implementations. Data processing system includes a package substrate 202 along, an input/output (I/O) die 204 and eight CPU core complex dies ("CCDs") 206. In this implementation, CCDs 206 and I/O Die 204 are mounted to package substrate 204 and connected by high speed Infinity Fabric™ (IF) interconnects. Package substrate 202 is packaged as a multi-chip-module (MCM) for insertion in a socket such as a land-grid-array (LGA) socket to interface with a printed-circuit-board (PCB) of a host data processing system.

In this implementation, each CCD 206 includes a number of Core Complexes (CCX), each of which includes multiple CPU cores and a shared level 3 cache, with each CPU core including level 1 and level 2 caches (not shown). A data fabric is provided on I/O die 204, including memory controllers (also not shown), as further described below. While in this implementation, a data processor constructed as a MCM is shown in order to illustrate a preferred implementation of a data fabric coherency protocol, in other implementations, the features herein may be embodied in a data processor implemented as an SOC.

Figure 3:
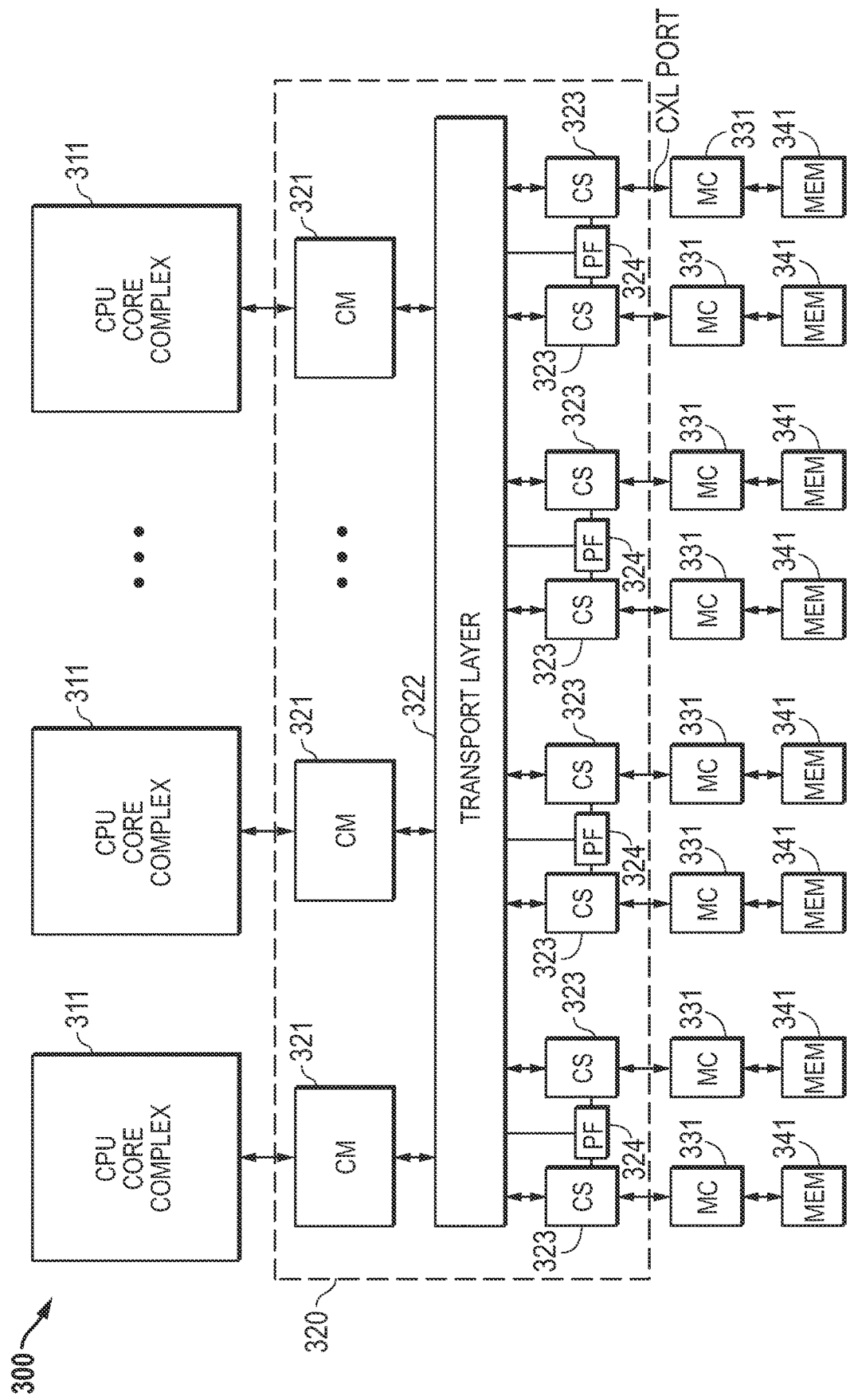
FIG. 3 illustrates in block diagram form a data processing system according to some implementations.

FIG. 3 illustrates in block diagram form a data processing system 300 according to some implementations. Data processing system 300 generally includes a data processor constructed like that of FIG. 2, including multiple CPU core complexes 311, a data fabric 320, multiple memory controllers ("MC") 331, and multiple memory devices 341. Many other components of an actual data processing system are typically present but are not relevant to understanding the present disclosure and are not shown in FIG. 3 for ease of illustration.

CPU core complexes 311 each include a set of CPU cores, each of which is bidirectionally connected to data fabric 320. Each CPU core may be a unitary core only sharing a last-level cache with the other CPU cores, or may be combined with some but not all of the other cores in clusters. While multiple CPU core complexes 311 are depicted, other types of processors (not shown) are also typically connected to data fabric 320 as clients, such as GPU cores, and display controllers.

Data fabric 320 includes a set of coherent master controllers 321 each labeled "CM", a set of coherent slave controllers 323 each labeled "CS" interconnected by and through a fabric transport layer 322, and a plurality of probe filters 324 each labeled "PF". Probe filter 324 may be any suitable type of probe filter. In some implementations, region probe filters are used in which a region of multiple lines is tracked. Other implementations employ other types of probe filters such as traditional line-based probe filters and variations thereof. As used herein, a coherent master controller is considered to be a master port because it can be connected to memory accessing agents that are capable of initiating memory access requests, regardless of whether the memory access requests are read or write accesses. Likewise, a coherent slave controller is considered to be a slave port because it connects to memory access responders such as memory controllers 311 that are capable of responding to memory access requests, regardless of whether the memory access requests are read or write accesses. Fabric transport layer 322 includes a crossbar router or series of switches for routing memory-mapped access requests and responses between its ports. Data fabric 320 also includes a system memory map, typically defined by a basic input/output system (BIOS), for determining destinations of memory accesses based on the system configuration. Data fabric 320 is includes a coherent master controller for each attached memory accessing agent, such as CPU core complexes 311. Each coherent master controller 321 has a bidirectional upstream port, a bidirectional downstream port, and a control input, as well as its own internal buffering for both accesses received from a client and responses received from a coherent slave through fabric transport layer 223. Each coherent master controller 321 also has a control interface connected to its upstream port to provide backpressure signaling to corresponding memory accessing agents to avoid overrunning its limited buffer space. Data fabric 320 is likewise constructed to have a coherent slave controller 323 for each of memory controllers 331. Each coherent slave controller 323 has buffering that allows memory access requests to be stored before or after being processed through fabric transport layer 322, depending the direction.

Each of memory controllers 331 has an upstream port connected to data fabric 320 through a corresponding coherent slave controller 323, and a downstream port connected to a corresponding memory device over a physical layer interface (PHY) such as a double data rate 5 (DDR5) PHY. In this implementation, three of memory controllers connect to a local memory channel and one (depicted on the right) is connected to a disaggregated memory module such as a high-bandwidth memory (HBM) module over a Peripheral Component Interface Express (PCIe) link. As such, while the first three depicted memory controllers 331 are located on the same die as the data fabric, the fourth is connected to data fabric 320 through the CXL PORT and resides on a memory module. Memory devices 341 are preferably dynamic random-access memory (DRAM), such as double data rate 5 (DDR5) DRAM, or disaggregated memory modules such as HBM modules.

Data processing system 300 is a highly integrated, high-performance digital data processor that performs many of the functions associated with a workstation, a server, or the like. In operation, data processing system 300 implements a unified memory space in which all memory in the system is potentially visible to each memory accessing agent such as CPU core complexes 311. Data fabric 320 is the medium by which accesses initiated by a memory accessing agent are provided to a memory accessing responder, and a response from a memory accessing responder is returned to the initiating memory accessing agent. Data fabric 320 uses a central fabric transport layer 322 to multiplex the accesses and responses between the corresponding master and slave controllers based on a system address map. The general operation of memory accessing agents such as coherent master controllers 321 is conventional and well known in the art and will not be described further. Likewise, the general operation of memory accessing responders is well known and is typically specified by a published standards, such as one or more of the double data rate (DDR) synchronous dynamic random-access memory (SDRAM) and HBM standards published by the Joint Electron Devices Engineering Council (JEDEC), and will not be described further except as concerning the features introduced herein.

Figure 4:
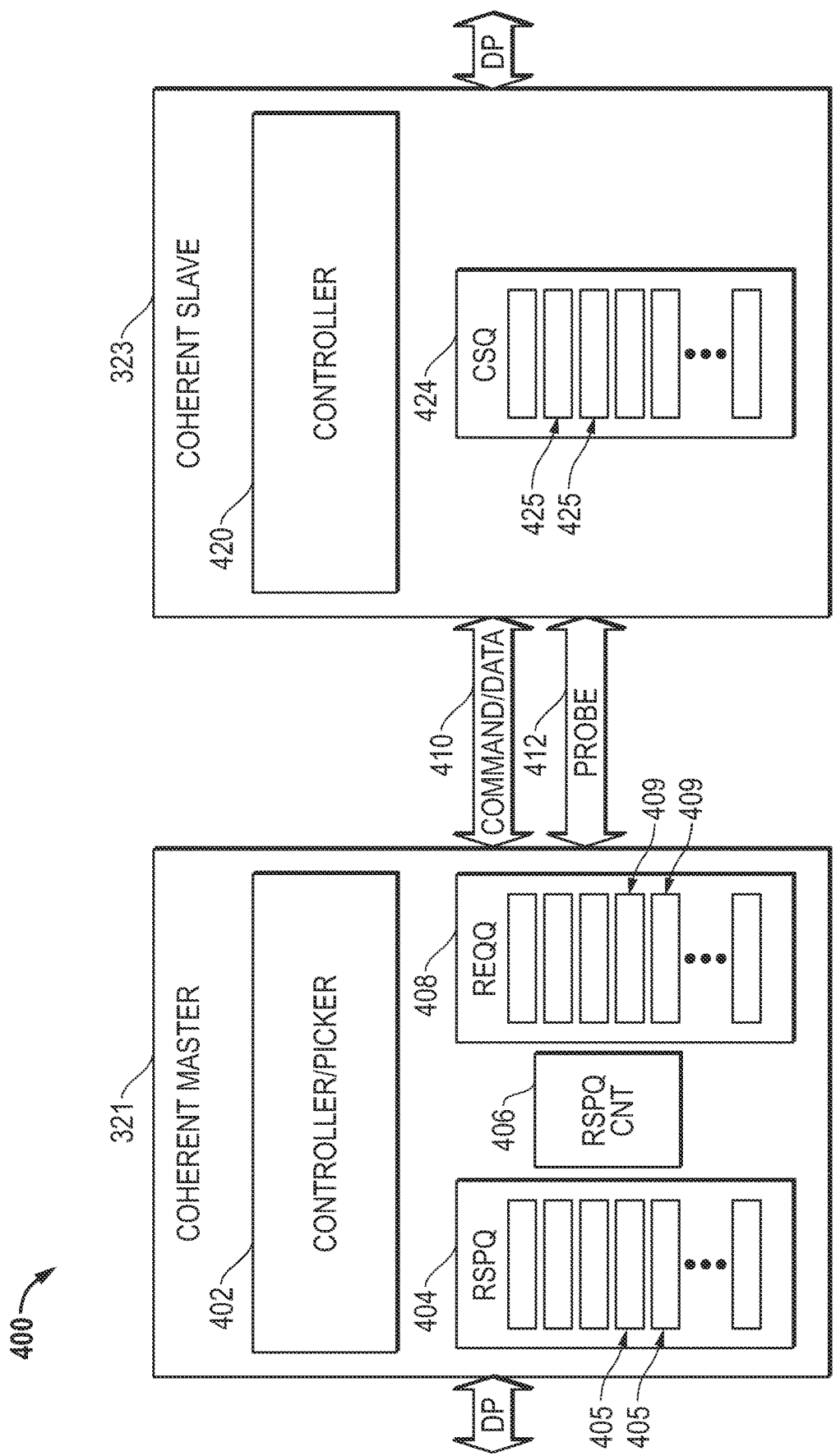
FIG. 4 illustrates in block diagram form a portion of a data fabric according to some implementations.

FIG. 4 illustrates in block diagram form a portion of a data fabric 400 including a coherent master controller 321 and a coherent slave controller 323 connected to a data fabric such as that of FIG. 3 according to some implementations.

Coherent master controller 321 includes a controller and picker circuit 402, a response data buffer 404 ("RSPQ"), a response data buffer counter 406 ("RSPQ CNT"), an outgoing request queue 408 ("REQQ"), and a data port labeled "DP" connecting to a client processor such as a CPU core complex. Coherent master controller 321 may also include other buffers such as a write data buffer, which is not shown because it is not pertinent to the description herein. RSPQ 404 includes a number of entries 405 for holding data responsive to memory requests over the data fabric. RSPQ CNT 406 is a counter holding a value of the available entries 405. In operation, memory access requests are received from a client processor over data port DP and held in REQQ 408 in one of entries 409 until they are fulfilled by coherent master controller 321 by accessing appropriate coherent slave controllers over data fabric 320. Coherent master controller 321 also handles coherency probes to its respective client processor. RSPQ CNT 406 is incremented as buffer entries 405 become available and decremented as memory access requests are picked by picker circuit 402 and corresponding buffer entries 405 are allocated to receive data, as further described below.

Coherent slave controller 323 includes a controller circuit 420, a coherent slave data buffer 424 ("CSQ"), and a data port labeled "DP" connecting to a memory controller. Coherent slave controller 323 may also include other buffers such as a write data buffer, which is not shown because it is not pertinent to the description herein. Coherent master controller 321 and coherent slave controller 323, as depicted, are connected over data fabric by two logical channels, a command and data channel 410 and a coherent probe channel 412. CSQ 424 includes a number of entries 425 for holding responsive data received from the memory controller over data port DP until the responsive data is sent to coherent master controller 321 according to the particular protocol employed.

In operation, coherent slave controller 323 receives memory access requests from coherent master controller 321 and fulfills them by accessing the memory controller over its data port DP, or by accessing coherency points over the data fabric for addresses that are cached at other coherency points. Controller circuit 420 manages the fulfillment of read and write requests, typically in the order received. Various coherency protocols are used in different implementations. In this implementation, a cache coherent Non-Uniform Memory Access (ccNUMA) architecture is employed, in which the data ports connecting the various subsystems to the data fabric are Scalable Data Ports (SDPs) and the coherent Hypertransport protocol is employed with additional functionality as further described below.

Figure 5:
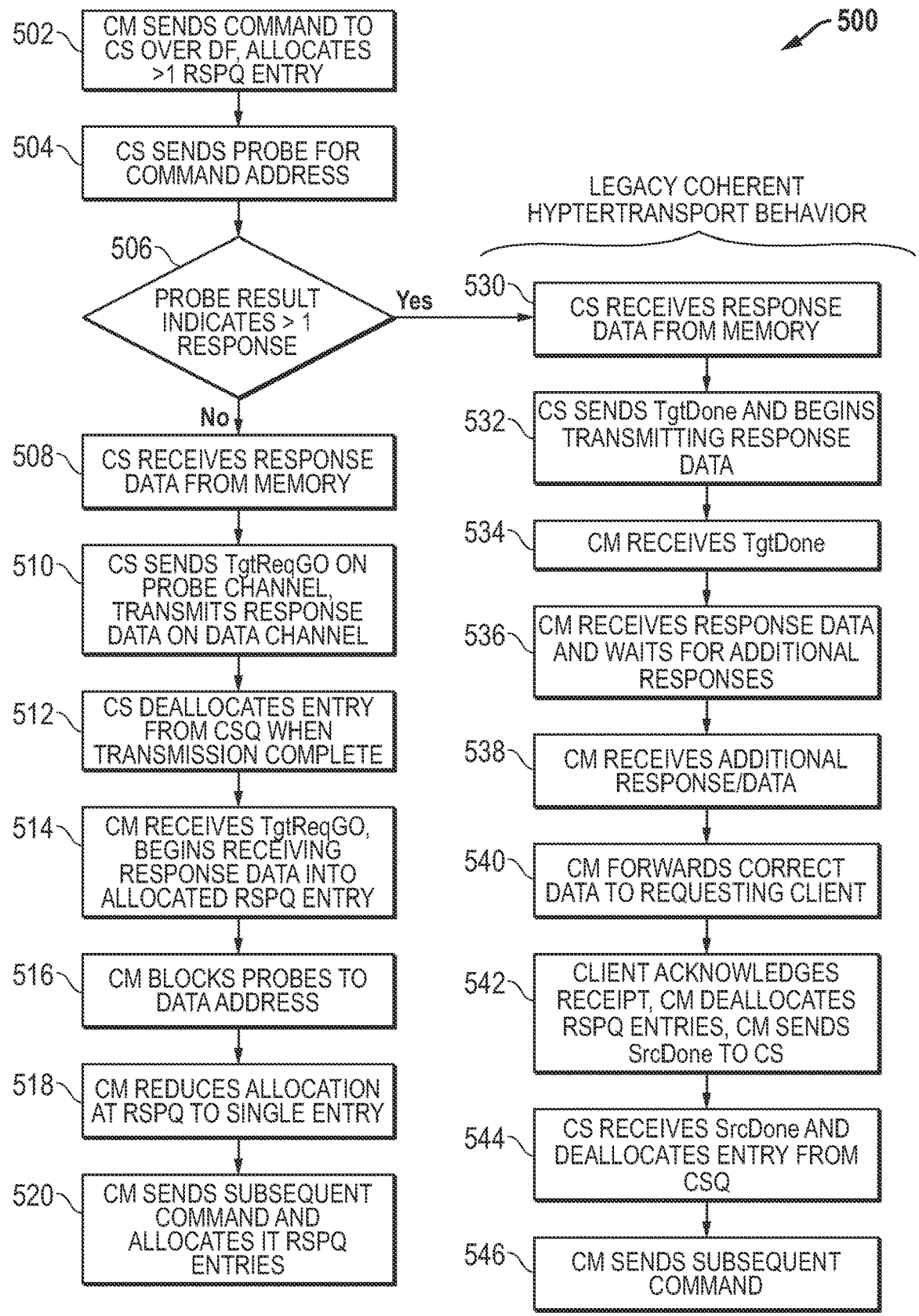
FIG. 5 shows a flowchart 500 of a process for operating a memory system according to some implementations.

FIG. 5 shows a flowchart 500 of a process for operating a memory system according to some implementations. The depicted process is suitable for use with the last level cache and traffic monitor of FIG. 3, or other suitable memory systems including a data fabric with coherent slave controllers and coherent master controllers. The process begins at block 502 where it sends a coherent block read command from a coherent master controller (CM) to a coherent slave controller (CS) over a coherent data fabric. The command is not sent until sufficient buffer entries are available at the coherent master controller's response data buffer, such as RSPQ 404 (FIG. 4). When the command is sent, the process allocates more than one buffer entry to receive responsive data for the command. More than one entry is needed because, at this point in the process, it is not known how many responses with responsive data will be provided from various coherency points on the memory system. For example, if the memory location targeted by the block read command is cached at more than one CPU, more than one response with responsive data may be expected.

At block 504, the coherent slave controller receives the coherent block read command and sends one or more coherency probes over the data fabric to determine where the most recent copy of the data for the command's target address is stored, which may be in main memory or somewhere among the system's various caches. The coherency probe(s) are of the respond to source ("RspToSrc") variety, indicating the response will go to the requesting coherent master. In this implementation, the coherency protocol supports memory lines at various level 1, level 2, and level 3 caches of the systems CPUs and GPUs. Preferably, the coherent slave controller accesses a probe filter such as PF 324 (FIG. 3) to accelerate coherency probe performance. The probe filter returns a set of potential probe targets, to which the coherent slave controller then sends coherency probes. Other probe filter arrangements, such as line-based probe filters, are used in some other implementations. For implementations in which no probe filter is used, the coherent slaves probes a predetermined set of targets designated for a particular memory address range.

When a result is obtained for the coherency probe at block 506, the process determines whether the result indicates that the coherent block read command is guaranteed to have only one data response, or determines that it is possible more than one coherency point has responsive data for the coherent block read command. If there will be only one data response, the process goes to block 508, and if not, it goes to block 530. Preferably, the coherent slave makes this determination based on the results of the coherency probe. For example, in the system of FIG. 3, a coherency probe from a CS 323 to PFs 324 may indicate that the target memory line is not cached by any of CPU core complexes 311. In this case, only the responsive data from the CS 323 (which may be obtained from a memory device 341 or from a last level cache between CS 323 and MC 331) will be provided to the requesting CM 321. In some scenarios, a coherency probe is not sent at all at block 504, for example if the targeted memory region is tagged as non-cacheable, no coherency probe is needed to determine that the coherent block read command is guaranteed to only have one data response. In another scenario, the coherency probe indicates that only one cache is expected to return a probe result with data. In this case, the coherent save controller also determines that only one coherency point will provide responsive data, and therefore the coherent block read command is guaranteed to have only one data response.

At block 508, when the coherent slave controller fulfills the coherent block read command (typically fulfilled in the order received), it receives response data from memory. Then at block 510, the coherent slave controller sends a target request globally ordered ("TgtReqGO") to the coherent master controller over a coherency probe channel of the coherent data fabric, and begins transmitting responsive data over a data channel of the coherent data fabric.

As shown at block 512, when the coherent slave controller has finished transmitting the responsive data (which may occur after some or all of blocks 512-520, depending on the speed of the data channel), the coherent slave de-allocates an entry of a coherent slave data buffer previously allocated for the responsive data immediately following transmitting the responsive data without requiring a source done message from the selected coherent master controller. In this implementation, the de-allocation at block 512 is done responsive to determining the coherent block read command from a selected coherent master controller is guaranteed to have only one data response, as opposed to the legacy behavior shown in blocks 530-546, where the coherent slave controller must wait for a "SrcDone" message, as further discussed below.

At block 514, the coherent master controller receives the TgtReqGO message, and begins receiving the responsive data. The responsive data is loaded into an allocated entry at the coherent master controller's response data buffer. Also responsive to receiving the target request globally ordered message, the coherent master controller performs blocks 516-520.

At block 516, the coherent master controller blocks any coherent probes to the address associated with the coherent block read command until the responsive data is received over the data channel, forwarded to the requesting client, and acknowledged by the requesting client. At block 518, the coherent master controller reduces the allocation at the response data buffer to a single entry, because it is known that further responses will not be received. In some implementations, this is done by increasing a counter indicating a number of data buffer entries available in the response data buffer, such as, for example, the RSPQ buffer counter 406 (FIG. 4). Other implementations may directly associate commands with response data buffer entries, in which case the coherent master controller removes the allocation of the additional entries to make them available, such that only one entry is allocated to receive the responsive data. At block 520, the coherent master sends a subsequent memory access command, which may be to the same coherent slave controller to which the coherent block read command was sent, or another coherent slave controller, depending on the target address associated with the command.

If, at block 506, the coherent slave controller, determines that the coherent block read command is not guaranteed to have only one data response, the process goes to block 530, where it receives the responsive data when fulfilling the coherent block read command. At block 532, the coherent slave controller transmits a target done ("TgtDone") message to the coherent master controller over the coherency probe channel, and begins transmitting responsive data for the coherent block read command to the coherent master over the data channel.

At block 534, the coherent master controller receives the TgtDone message and begins receiving the responsive data. At block 536, the coherent master controller finishes receiving the response data and waits for further responses from the coherency probes (the probes sent at block 504). At block 538, the coherent master controller receives one or more additional responses to the coherency probe, which may include responsive data or may include an indication that the coherency point has no responsive data. Responses can arrive before the response from the coherent slave controller. Incoming responsive data is loaded into the second allocated entry of the response data buffer. If newer responsive data is received than that sent by the coherent slave controller, the coherent master controller will overwrite the older entry with a third or subsequent response if such responses occur. When all responses have been received, the coherent master forwards the correct, most recent, data to the requesting client such as a CPU or GPU as shown at block 540.

Then, at block 542, when the client acknowledges receipt of the responsive data, the coherent master controller de-allocates the response data buffer entry from which the data was sent, and sends a source done ("SrcDone") message to the coherent slave controller. At block 544, the coherent slave controller receives the SrcDone message and, in response, de-allocates a data buffer entry out of which the data was transmitted. Then at block 546, the coherent master controller sends a subsequent memory access command, allocating entries for it in the response data buffer.

Generally, in this implementation, the Coherent Hypertransport Protocol execution of a coherent block read command shown at blocks 530-546 is only used when more than one response is possible for the command. The SrcDone message that is transmitted from the coherent master controller to the coherent slave controller is to inform the coherent slave controller that the read response has been made visible to the requesting client the coherent slave is free to move on to the next address matching transaction. This process avoids a race with a coherency probe for a younger transaction to the same address. However, majority of cache block reads are not expected to cause coherency probes. Therefore, requiring a SrcDone message for every cache block read increases the average life time of a transaction at the coherent slave beyond that achieved by the depicted process. Further, when a coherency protocol resolves coherency probes with the read response for a cache block read at the coherent master, as is generally more efficient for reads, it has to contend with the possibility of two responses with data that may arrive at different times. This possibility adds burden on the design to reserve multiple data buffer entries at the coherent master for every cache block read that is sent to the coherent slave.

The process of blocks 506-520, instead of using the slower SrcDone message sequence, instead employs a different message in the probe channel, the target request globally ordered (TgtReqGO). In some implementations, the TgtReqGO message may be implemented as a single bit carried in a target done (TgtDone) message of the legacy Hypertransport protocol. In other implementations, it may be a packet that is used instead of the TgtDone message. The TgtReqGO blocks the processing of any younger probes to the same address until the previous transaction completes entirely. The advantages are provided most when no coherency probes are issued or when a single known external cache is expected to return a probe response with data. Significant advantages are provided in data buffer management when a TgtReqGO is issued, because the coherent master protocol can free up data buffer entries that were previously reserved to receive additional probe responses with responsive data. Furthermore, data buffer entries at the coherent slave controller are also freed up more quickly than the legacy scenario. As can be understood, this allows a smaller data buffer design for both the response data buffer at the coherent master (for example, RSPQ 404, FIG. 4), and the data buffer at the coherent slave (for example, CSQ 424, FIG. 4).

Data fabric 320 of FIG. 3 or any portions thereof, such as coherent master controllers 321 and coherent slave controller 323, may be described or represented by a computer accessible data structure in the form of a database or other data structure which can be read by a program and used, directly or indirectly, to fabricate integrated circuits. For example, this data structure may be a behavioral-level description or register-transfer level (RTL) description of the hardware functionality in a high-level design language (HDL) such as Verilog or VHDL. The description may be read by a synthesis tool which may synthesize the description to produce a netlist including a list of gates from a synthesis library. The netlist includes a set of gates that also represent the functionality of the hardware including integrated circuits. The netlist may then be placed and routed to produce a data set describing geometric shapes to be applied to masks. The masks may then be used in various semiconductor fabrication steps to produce the integrated circuits. Alternatively, the database on the computer accessible storage medium may be the netlist (with or without the synthesis library) or the data set, as desired, or Graphic Data System (GDS) II data.

While particular implementations have been described, various modifications to these implementations will be apparent to those skilled in the art. The various techniques used in conjunction with the retention low power state for the probe filter disclosed herein can be used independently or in conjunction with the other techniques. Moreover, different techniques and circuits can be used to detect the conditions responsive to which the retention low power state is entered.

Accordingly, it is intended by the appended claims to cover all modifications of the disclosed implementations that fall within the scope of the disclosed implementations.

What is claimed is:

1. A coherent memory fabric comprising:
   a plurality of coherent master controllers each including a response data buffer; and
   a coherent slave controller coupled to the plurality of coherent master controllers, the coherent slave controller operable to, responsive to determining a selected coherent block read command from a selected coherent master controller is guaranteed to have only one data response, send a target request globally ordered message to the selected coherent master controller and transmit responsive data.

2. The coherent memory fabric of claim 1, wherein the selected coherent master controller, responsive to the target request globally ordered message, updates an allocation in the response data buffer such that only one response data buffer entry is reserved for the selected coherent block read command.

3. The coherent memory fabric of claim 2, wherein the selected coherent master controller is operable to, responsive to receiving the target request globally ordered message, block any coherent probes to an address associated with the selected coherent block read command until receipt of the responsive data is acknowledged by a requesting client.

4. The coherent memory fabric of claim 2, wherein the selected coherent master controller, after updating the allocation, immediately transmits a subsequent memory access command to the coherent slave controller.

5. The coherent memory fabric of claim 1, wherein:
   the coherent slave controller further comprises a coherent slave data buffer; and
   the coherent slave controller, responsive to determining a selected coherent block read command from a selected coherent master controller is guaranteed to have only one data response, de-allocates an entry of the coherent slave data buffer previously allocated for the responsive data immediately following transmitting the responsive data without requiring a source done message from the selected coherent master controller.

6. The coherent memory fabric of claim 5, wherein:
   the coherent slave controller, responsive to determining a second selected coherent block read command is not guaranteed to have only one data response, transmits a target done message to the selected coherent master controller, transmits response data to the selected coherent master controller, and de-allocates a coherent slave data buffer entry for the responsive data only after receiving a source done message from the selected coherent master controller indicating that the responsive data has been received.

7. The coherent memory fabric of claim 1, wherein the coherent slave controller determines that the selected coherent block read command is guaranteed to have only one data response by performing a probe filter lookup in a probe filter associated with the plurality of coherent master controllers.

8. A method, comprising:
   from a coherent master controller, transmitting a coherent block read command to a coherent slave controller over a coherent data fabric;
   at the coherent slave controller, determining that the coherent block read command is guaranteed to have only one data response; and
   at the coherent slave controller, responsive to determining the coherent block read command is guaranteed to have only one data response, sending a target request globally ordered message to the coherent master controller and transmitting responsive data.

9. The method of claim 8, wherein the coherent master controller, responsive to the target request globally ordered message, updates an allocation in a response data buffer such that only one response data buffer entry is reserved for the coherent block read command.

10. The method of claim 9, further comprising, at the coherent master controller, responsive to receiving the target request globally ordered message, blocking any coherent probes to an address associated with the coherent block read command until the responsive data is received.

11. The method of claim 9, wherein the coherent master controller, after updating the allocation, immediately transmits a subsequent memory access command to the coherent slave controller.

12. The method of claim 8, wherein the coherent slave controller, responsive to determining the coherent block read command from a selected coherent master controller is guaranteed to have only one data response, de-allocates an entry of a coherent slave data buffer previously allocated for the responsive data immediately following transmitting the responsive data without requiring a source done message from the selected coherent master controller.

13. The method of claim 8, wherein the coherent slave controller, responsive to determining that a second coherent block read command is not guaranteed to have only one data response, transmits a target done message to the coherent master controller, transmits second response data to the coherent master controller, and de-allocates a data buffer entry for the responsive data only after receiving a source done message from the coherent master controller indicating that the second response data has been received.

14. The method of claim 8, wherein the coherent slave controller begins transmitting the responsive data in parallel with sending the target request globally ordered message, or immediately after sending the target request globally ordered message.

15. The method of claim 8, wherein the coherent slave controller determines that the coherent block read command is guaranteed to have only one data response by performing a probe filter lookup in a probe filter associated with a plurality of coherent master controllers.

16. A data processing system comprising:
a plurality of data processors;
a volatile memory; and
a coherent memory fabric including:
a plurality of coherent master controllers coupled to respective ones of the data processors and each including a response data buffer; and
a coherent slave controller coupled to the volatile memory over a bus, and coupled to the plurality of coherent master controllers, the coherent slave controller operable to, responsive to determining a selected coherent block read command from a selected coherent master controller is guaranteed to have only one data response, send a target request globally ordered message to the selected coherent master controller and transmit responsive data.

17. The data processing system of claim 16, wherein the selected coherent master controller, responsive to the target request globally ordered message, updates an allocation in the response data buffer such that only one response data buffer entry is reserved for the selected coherent block read command.

18. The data processing system of claim 17, wherein the selected coherent master controller is operable to, responsive to receiving the target request globally ordered message, block any coherent probes to an address associated with the selected coherent block read command until the responsive data is received.

19. The data processing system of claim 16, wherein:
the coherent slave controller further comprises a coherent slave data buffer; and
the coherent slave controller, responsive to determining a selected coherent block read command from a selected coherent master controller is guaranteed to have only one data response, de-allocates an entry of the coherent slave data buffer previously allocated for the responsive data immediately following transmitting the responsive data without requiring a source done message from the selected coherent master controller.

20. The data processing system of claim 19, wherein:
the coherent slave controller, responsive to determining a second selected coherent block read command is not guaranteed to have only one data response, transmits a target done message to the selected coherent master controller, transmits response data to the selected coherent master controller, and de-allocates a coherent slave data buffer entry for the responsive data only after receiving a source done message from the selected coherent master controller indicating that the response data has been received.

* * * * *